L. F. MONTGOMERY.

SHOE SOLE.

APPLICATION FILED MAY 23, 1918.

Reissued Dec. 24, 1918. 14,577.

Witnesses

J. F. Bowen

John S. Powers.

Inventor:

Leon F. Montgomery, by James L. Norris

Attorney.

UNITED STATES PATENT OFFICE.

LEON F. MONTGOMERY, OF FORT RECOVERY, OHIO, ASSIGNOR OF ONE-HALF TO JAMES E. GROSJEAN AND ONE-FOURTH TO FRANK L. MAIRE, BOTH OF LIMA, OHIO.

SHOE-SOLE.

14,577. Specification of Reissued Letters Patent. Reissued Dec. 24, 1918.

Original No. 1,212,985, dated January 16, 1917, Serial No. 62,982, filed November 23, 1915. Application for reissue filed May 23, 1918. Serial No. 236,250.

*To all whom it may concern:*

Be it known that I, LEON F. MONTGOMERY, a citizen of the United States, residing at Fort Recovery, in the county of Mercer and State of Ohio, have invented new and useful Improvements in Shoe-Soles, of which the following is a specification.

This invention relates to improvements in composite soles for boots or shoes and its principal objects are to provide a sole which may be manufactured with marked facility and at relatively low cost and which shall have superior qualities as regards flexibility and comfort, durability and cushioning and anti-skidding properties. With the above objects in view, the invention consists in certain features of structure and organization essentially involving the combination of a strong and readily flexible base or backing and a composite tread portion.

An embodiment of the invention is illustrated in the accompanying drawings, wherein—

Similar characters of reference designate corresponding parts throughout the several views.

Figure 2:
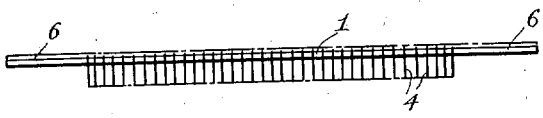
Fig. 2 is a cross sectional view of the base or backing employed in the embodiment disclosed.
Figure 1:
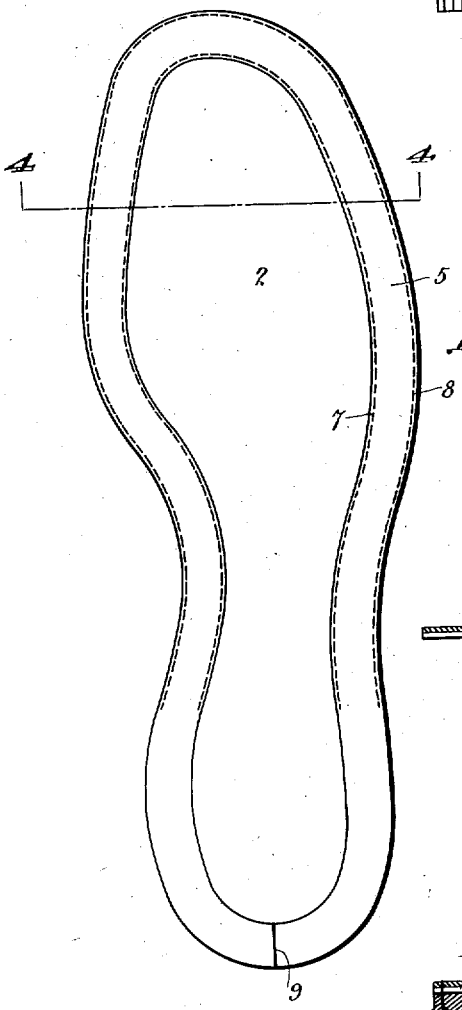
Figure 1 is a bottom plan view of a composite sole in which the features of the invention are incorporated.
Figure 3:
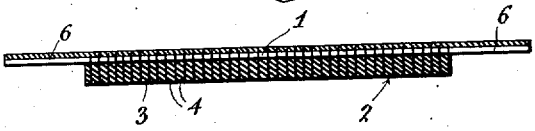
Fig. 3 is a similar view showing the composite tread portion as applied to the base or backing.
Figure 4:
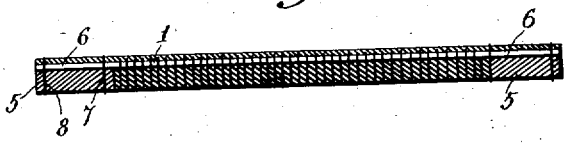
Fig. 4 is a similar view on line 4—4 of Fig. 1.
Figure 5:
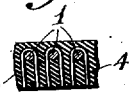
Fig. 5 is a section on a somewhat enlarged scale showing details of the composite tread portion.

The improved sole essentially includes a substantially flat, strong and readily flexible base or backing 1 and a composite tread portion 2.

The base 1 is preferably composed of a woven fabric and the tread portion 2 is composed of a vulcanizable material 3, of rubber or a rubber compound in which fibers 4 are incorporated at close intervals, said fibers being presented endwise to the tread surface.

In the finished sole the tread portion is vulcanized whereby a strong and permanent bond of its components, *i. e.* the rubber or rubber compound material and the fibers incorporated therein, is effected; and the finished tread portion is also continuously, strongly and permanently bonded to said base, this being preferably effected by vulcanizing the base and tread portion together. The base thereby provides a sensible reinforcement for the tread portion in directions of its plane and at the same time does not appreciably impair the flexibility of the sole. In this preferred construction the vulcanization of the tread portion and its union by vulcanization to the base may be effected in a single operation.

In the embodiment disclosed the base 1 is produced from pile fabric, being constituted by the woof or woven basis of such fabric; and the weft threads of the said fabric, *i. e.* the threads which project at the angle from the woof or woven basis, are utilized to provide the fiber 4 of the tread portion and are completely saturated with, *i. e.* embedded or anchored in, rubber or rubber compound material which, in vulcanization, is securely bonded to said fibers and securely and continuously bonded to the base 1.

The sole is preferably completed by a permanently and securely attached supporting strip 5 whose inner edge continuously abuts the tread portion. In the preferred construction the base 1 is provided with a marginal portion 6 which projects beyond the composite tread portion and to which the supporting strip 5 is secured. The marginal portion 6 affords a flat, uniform and relatively extensive bearing for the strip 5 and said strip, of course, conforms in outline and extent to said marginal portion.

Where, as in the construction disclosed, the base 1 is produced from pile fabric the marginal portion 6 may be provided by suitably cutting away the weft threads along the edge of the base to a line substantially coincident with the edge of the composite tread portion.

As shown the strip 5 is of sole leather in which case its attachment to the sole, specifically to the marginal portion 6 of the base 1 in the embodiment disclosed, is effected by stitching of which there are preferably two lines 7 and 8, the outer line of stitching 8 serving also to attach the sole to the shoe. As composed of sole leather the strip 5 may have a scarfed joint at the heel as shown at 9.

Various changes may be made in the details of construction and in the materials used, without departing from the spirit and scope of the invention as defined in the appended claims.

Having fully described my invention, I claim:—

1. A shoe sole comprising a cut piled fabric having the weft fiber normal to one surface of its basis, said fabric having the outer edge of its weft fibers removed so that a portion of the basis projects beyond said fibers, and a marginal strip secured around the weft fibers and against said projecting portion of said basis to prevent the spreading and lateral movement of the fibers.

2. A shoe sole comprising a cut piled fabric having the weft fibers normal to one surface of its basis, a rubber compound filling for the fabric, said fabric having the weft fibers removed at the outer edge, a marginal strip secured around said outer edge having its inner vertical edge abutting the weft fibers to prevent the spreading thereof, said strip being formed integral and extending around the sole and heel, and means to secure the free ends of said strip together.

3. A sole for boots or shoes having a tread portion of rubber and fibers wholly incorporated in the rubber and presented endwise to the tread surface, and a flexible reinforcing base which includes threads regularly arranged throughout its area, the threads of the tread portion being anchored to said base and the rubber of the tread portion being imposed on said base and by vulcanization united thereto and to said fibers.

4. A sole for boots or shoes having a tread portion of rubber and fibers wholly incorporated in the rubber and presented endwise to the tread surface, and a flexible reinforcing base of woven fabric, the threads of the tread portion being secured to said fabric and the rubber of the tread portion being imposed on said fabric and by vulcanization united thereto and to said fibers.

5. A sole for boots or shoes having a vulcanized tread portion of rubber and fibers wholly incorporated in the rubber and presented endwise to the tread surface, and a flexible reinforcing base comprising a woven fabric, the threads of the tread portion being secured to said base and the rubber of the tread portion being imposed on and permanently connected to said base.

6. A sole having a reinforcing base and a tread portion secured thereto and comprising an element of woven fabric constituting said base, and fibers secured to said fabric and constituting components of the tread portion, the latter including rubber in which said fibers are wholly embedded and which is continuously bonded to said fabric, said rubber and fibers being vulcanized together and said fibers being presented endwise to the wearing surface of said tread portion.

7. A sole having a reinforcing base and a tread portion secured thereto and comprising an element of pile fabric whose woven portion constitutes said base and whose weft threads constitute components of the tread portion, the latter including rubber in which said threads are embedded and to which the said element is continuously bonded by vulcanization, said threads being presented endwise to the wearing surface of said tread portion.

In testimony whereof I have hereunto set my hand in presence of two subscribing witnesses.

LEON F. MONTGOMERY.

In presence of—
CORA WHITESELL,
W. O. SLEMMER.